United States Patent
Kirschey

(10) Patent No.: US 6,846,241 B2
(45) Date of Patent: Jan. 25, 2005

(54) ONE-PIECE COUPLING DISK

(75) Inventor: Gerhard Kirschey, Wuppertal (DE)

(73) Assignee: Centa-Antriebe Kirschey GmbH, Haan (DE)

(*) Notice: Subject to any disclaimer, the term of this patent is extended or adjusted under 35 U.S.C. 154(b) by 0 days.

(21) Appl. No.: 10/387,124

(22) Filed: Mar. 12, 2003

(65) Prior Publication Data
US 2003/0232653 A1 Dec. 18, 2003

(30) Foreign Application Priority Data
Mar. 15, 2002 (DE) .......................... 102 11 484

(51) Int. Cl.[7] ................................. F16D 3/78
(52) U.S. Cl. ........................... 464/98; 267/161
(58) Field of Search ............... 464/98, 99; 267/161, 267/162

(56) References Cited

U.S. PATENT DOCUMENTS

| | | | | |
|---|---|---|---|---|
| 1,460,212 A | * | 6/1923 | Olive | ........................... 464/98 |
| 2,947,529 A | * | 8/1960 | Schwartz et al. | ........... 267/161 |
| 3,170,736 A | * | 2/1965 | Wright | ................... 267/161 X |
| 5,109,727 A | * | 5/1992 | Joyce | ........................ 464/98 X |
| 5,387,157 A | * | 2/1995 | Nameny | ...................... 464/98 |

FOREIGN PATENT DOCUMENTS

| | | | | |
|---|---|---|---|---|
| DE | 463 160 | * | 7/1928 | ................. 267/161 |
| DE | 2020 178 | | 11/1971 | |
| DE | 134 980 | | 4/1979 | |
| DE | 29 48 179 | | 6/1981 | |
| DE | 42 11 619 | | 10/1993 | |
| DE | 43 38 039 | | 5/1995 | |
| DE | 195 43 130 | | 5/1997 | |
| JP | 5-187453 | * | 7/1993 | ................... 464/98 |

* cited by examiner

Primary Examiner—Greg Binda
(74) Attorney, Agent, or Firm—Herbert Dubno; Andrew Wilford

(57) ABSTRACT

A coupling has an inner ring centered on an axis, an outer ring surrounding and generally coaxial with the inner ring, and an intermediate ring generally coaxial with and between the inner ring and outer ring. A pair of mainly angularly extending, flexible, and parallel inner links have inner ends attached at respective locations to an outer periphery of the inner ring and outer ends attached at respective locations to an inner periphery of the intermediate ring, and a pair of mainly angularly extending, flexible, and parallel outer links have inner ends attached at respective locations to an outer periphery of the intermediate ring and outer ends attached at respective locations to an inner periphery of the outer ring. The outer links extend transversely of the inner links, and the rings and links are unitarily formed with one another.

7 Claims, 4 Drawing Sheets

# ONE-PIECE COUPLING DISK

FIELD OF THE INVENTION

The present invention relates to coupling. More particularly this invention concerns disk for coupling a rotary drive element to a rotatable load.

BACKGROUND OF THE INVENTION

A typical coupling such as described in East German patent document 134,980, German published application 2,948,179 of Barth and Viets, German published application 2,020,178 of Ernst and Bangert, German published application 4,211,619 of Haarmann and Bremer, German published application 4,338,039 of Gassen, and German published application 195 43 130 of Haarmann, Bremer, and Rast has an inner part, normally a ring, adapted to be connected to an engine or motor output shaft and an outer part that is normally connected to a load, for instance a flywheel, although of course the driving and driven parts could be reversed. In order to allow for some limited misalignment of the centers of the inner and outer parts, they are interconnected by a plurality of links having inner ends connected to the inner part and outer ends connected to or forming the outer part.

Since the links must transmit torque between the inner ring and the outer part, while still permitting relative radial movement of the inner ring and outer part, the links do not extend perfectly radially between the inner and outer parts. Hence it is standard to provide elongated links that are of generally fixed length between their inner and outer ends but that can be flexed somewhat, and to orient these links so that they extend more angularly than radially. In above-cited German 195 43 130, for example, there are two pairs of links that extend perpendicular to each other. Thus when the inner part, for example, moves parallel to one of the pairs, the other pair will flex, and vice versa, all while the links will continue to effectively transmit torque between the inner and outer coupling-disk parts.

Such a coupling can be relatively bulky and incapable of, at the same time, transmitting considerable torque while compensating for considerable radial or axial misalignment. The links can rupture when overloaded, leading to total failure of the coupling.

OBJECTS OF THE INVENTION

It is therefore an object of the present invention to provide an improved coupling element or disk.

Another object is the provision of such an improved coupling element or disk which overcomes the above-given disadvantages, that is which is relatively compact and inexpensive to manufacture.

A further object is to provide a coupling disk capable of transmitting considerable torque while compensating for considerable axial and/or radial misalignment of the rotation axes of the driving and driven elements connected to its inner and outer parts.

SUMMARY OF THE INVENTION

A coupling has according to the invention an inner ring centered on an axis, an outer ring surrounding and generally coaxial with the inner ring, and an intermediate ring generally coaxial with and between the inner ring and outer ring. A pair of mainly angularly extending, flexible, and parallel inner links have inner ends attached at respective locations to an outer periphery of the inner ring and outer ends attached at respective locations to an inner periphery of the intermediate ring, and a pair of mainly angularly extending, flexible, and parallel outer links have inner ends attached at respective locations to an outer periphery of the intermediate ring and outer ends attached at respective locations to an inner periphery of the outer ring. The outer links extend transversely of the inner links, and the rings and links are unitarily formed with one another.

Thus with this arrangement there are two basic systems that compensate for misalignments of the driving and driven members which are attached to the inner and outer rings. Deflections perpendicular to the inner links are compensated for by their deformation, and deflections perpendicular to the outer links are compensated for by their deformation. Deflections diagonal to the links are compensated for by deformations of all of them. The provision of the intermediate ring ensures complete noninterference between the inner and outer links while allowing the coupling disk according to the invention to transmit considerable torque.

According to the invention the rings and links are of the same axial thickness and are of plastic. The inner links are perpendicular to the outer links.

In one system according to the invention the inner links extend in opposite angular directions from the respective inner ends and the outer links also extend in opposite angular directions from the respective inner ends. This is ideal for a coupling intended to transmit torque in one direction only.

When torque needs to be transmitted in both rotational directions, the inner links extend in the same angular direction from the respective inner ends and the outer links also extend in the same angular direction from the respective inner ends. For maximum torque capacity in such a bidirectional coupling there is a second pair of flexible inner links extending parallel to the first-mentioned pair of inner links and having inner ends attached at the inner-link inner-end locations to the outer periphery of the inner ring and outer ends attached at respective locations to the inner periphery of the intermediate ring and a second pair of flexible outer links extending parallel to the first-mentioned pair of outer links and having inner ends attached at the outer-link inner-end locations to the outer periphery of the intermediate ring and outer ends attached at respective locations to the inner periphery of the outer ring. In this case the second pairs of links extend angularly oppositely from the respective inner ends to the respective first pairs of links.

To minimize the mass of the coupling, in accordance with the invention the intermediate ring is formed with a plurality of axially throughgoing holes leaving webs extending diagonally of the links. Under any circumstance, the rings are substantially thicker, that is radially so as to be of greater cross section, than the links.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
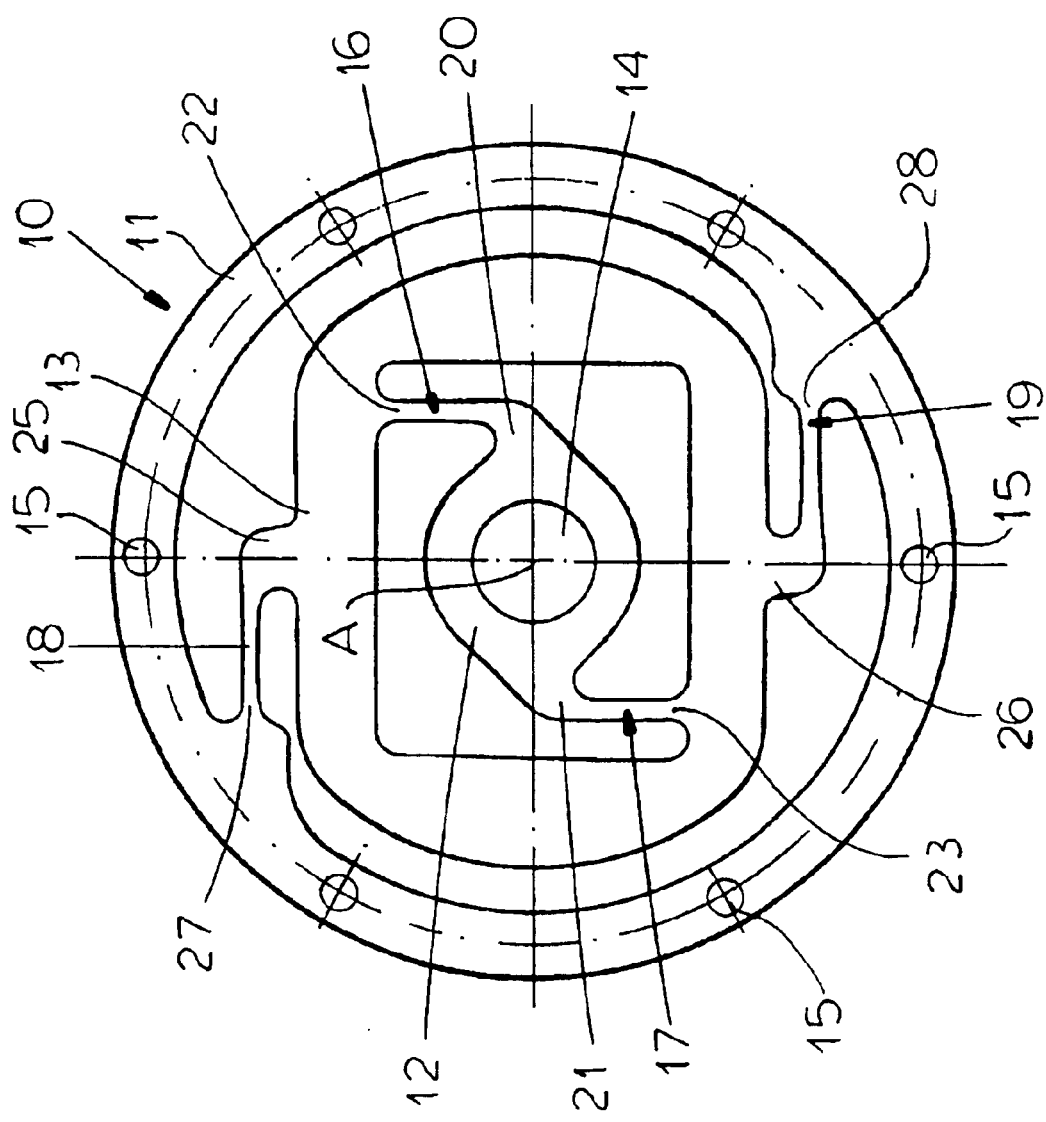
FIGS. 1, 2, and 3 are axial side views of couplings according to the invention.

As seen in FIG. 1 a coupling disk 10 according to the invention has an outer part or ring 11 adapted to be attached, e.g. by bolts through holes 15, to a driven element such as a flywheel and an inner part or ring 12 having a center hole 14 adapted to be fixed, e.g. by an inset metal splined sleeve, to a driving element such as a diesel-motor output shaft. The two rings 11 and 12 are centered on a common axis A and are both annularly continuous and basically circular.

Between and coaxial with the rings 11 and 12 is an intermediate ring 13. Inner links 16 and 17 formed as flexible bars have inner ends attached to generally diametrally opposite locations 20 and 21 on an outer periphery of the inner ring 12 and outer ends attached at generally diametrally opposite locations 22 and 23 on an inner periphery of the intermediate ring 13. Similar outer links 18 and 19 have inner ends attached to generally diametrally opposite locations 25 and 26 on an outer periphery of the intermediate ring 13 and outer ends connected at generally diametrally opposite locations 27 and 28 on an inner periphery of the outer ring 11. The rings 11, 12, and 13 and the links 16, 17, 18, and 19 are unitarily formed of plastic, here reinforced with glass fibers, and of the same axial dimension. The two inner links 16 and 17 extend parallel to each other and perpendicular to the two outer links 18 and 19 which are also parallel to each other.

Thus if as shown in FIG. 1 the inner ring 12 is moved to the right or left relative to the outer part 11 (or vice versa), the inner arms 16 and 17 will deform elastically and the rest of the structure will not change shape. If the inner ring 12 is moved up or down relative to the outer part 11, the inner ring 12, links 16 and 17, and intermediate ring 13 will follow this movement, and the outer links 18 and 19 will bend. Diagonal movements will create a combination of these movements. Since, however the links 16, 17, 18, and 19 all extend tangentially here, where the system is intended to rotate clockwise, they can transmit considerable torque from the inner ring 12 to the outer ring as they are loaded almost exclusively in tension.

Figure 2:
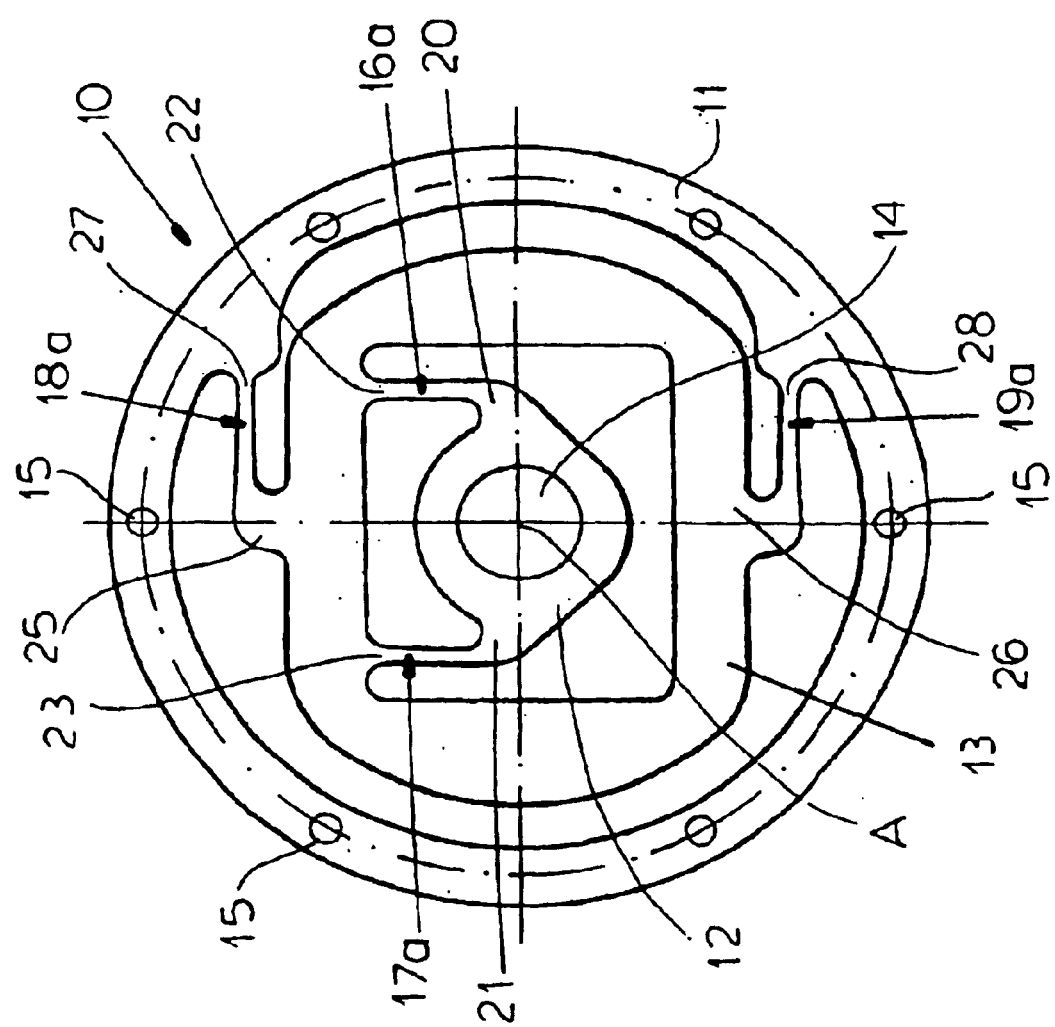

Whereas in FIG. 1 the links 16 and 17 as well as the links 18 and 19 extend in opposite directions from their inner ends 20, 21, 25, and 26, in FIG. 2 equivalent second links 16a, 17a, 18a, and 19a extend in the same directions. This embodiment functions identically to that of FIG. 1 and is identical to it in all other respects, with reference numerals from FIG. 1 being used for identical structure. This coupling is intended to transmit torque in both directions and at any given time only one of the inner links 16a and 17a and one of the outer links 18a and 19a will be loaded in tension and the other in compression.

Figure 3:
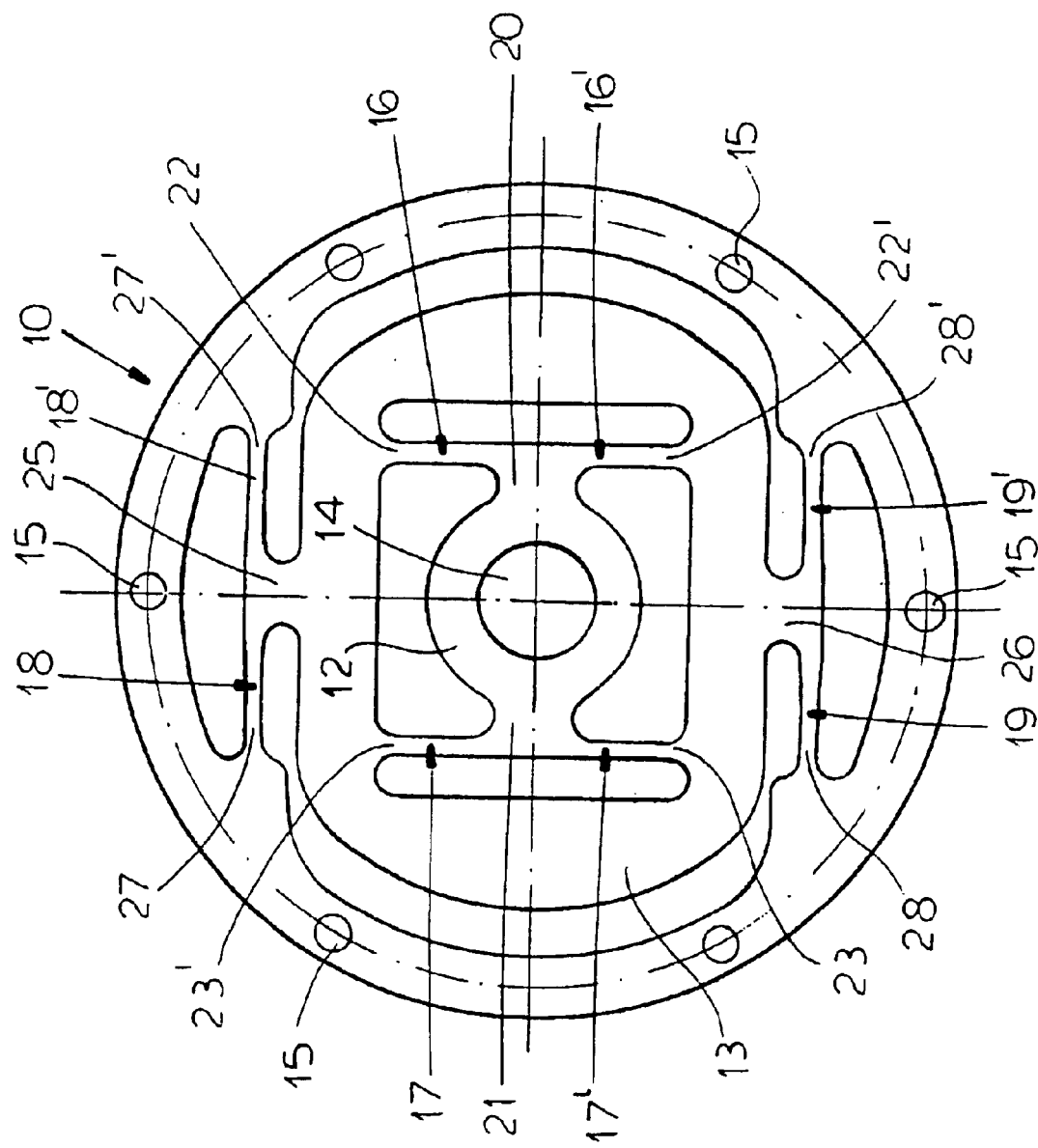
Figure 4:
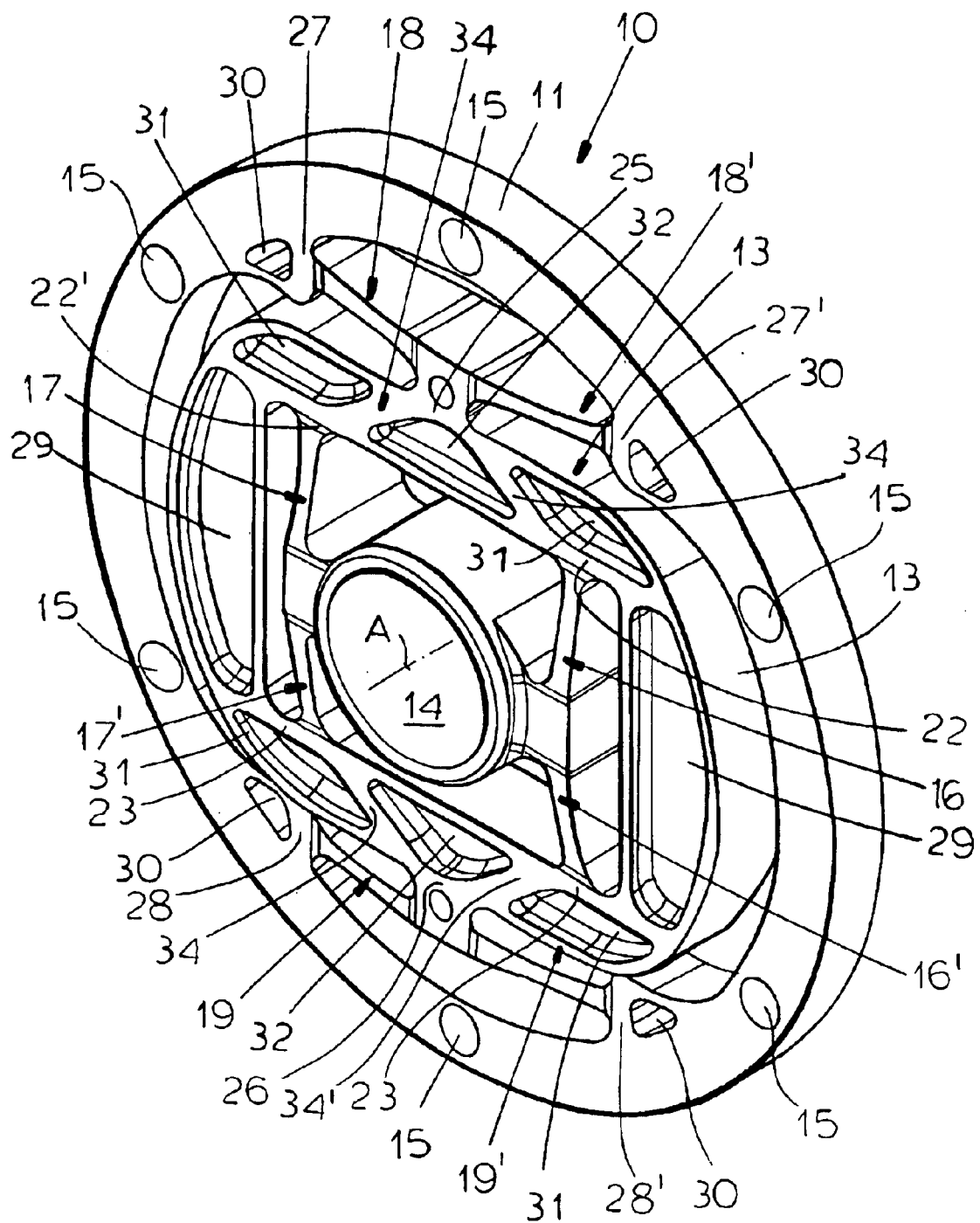
FIG. 4 is a perspective view of a variant on the FIG. 3 coupling.

The arrangement of FIGS. 3 and 4, where reference numerals from FIG. 1 are used for identical structure, has two inner links 16 and 16' extending oppositely from a common inner end 20 and having outer ends 22 and 22' attached to the intermediate ring 13 and two inner links 17 and 17' extending oppositely from a common inner end 21 and having outer ends 23 and 23' attached to the intermediate ring 13. Similarly two outer links 18 and 18' extend oppositely from a common inner end 25 to respective outer ends 27 and 27' on the outer ring 11 and two outer links 19 and 19' extend oppositely from a common inner end 26 to respective outer ends 28 and 28' on the outer ring 11. The inner links 16, 16', 17, and 17' extend parallel to each other as do the outer links 18, 18', 19, and 19' which are perpendicular to them. Thus with this arrangement two of the inner links 16, 16', 17, and 17' and two of the outer links 18, 18', 19, and 19' will be loaded, regardless of the direction torque is transmitted between the outer ring 11 and inner ring 12.

FIG. 4 shows a variant on the system of FIG. 3. It has axially throughgoing holes 30 formed in the outer ring 11 at the locations 27, 27', 28, and 28' where the outer ends of the links 18, 18', 19, and 19' are attached to the outer ring 11. In addition the intermediate ring 13 is formed with throughgoing holes 29, 31, and 32 that leave diagonal webs 34. These cutouts or holes 29, 31, and 32 substantially lighten the structure without significantly weakening it. The diagonal webs 34 prevent the intermediate ring, which in effect is reduced to an outer subring connected to the outer links 18, 18', 19, and 19' and an inner subring connected to the inner links 16, 16', 17, and 17', from deforming when loaded torsionally.

I claim:

1. A coupling comprising:

an inner ring centered on an axis;

an outer ring surrounding and generally coaxial with the inner ring;

an intermediate ring generally coaxial with and between the inner ring and outer ring;

a pair of mainly angularly extending, flexible, and parallel first inner links having inner ends attached at respective locations to an outer periphery of the inner ring and outer ends attached at respective locations to an inner periphery of the intermediate ring; and a pair of mainly angularly extending, flexible, and parallel first outer links having inner ends attached at respective locations to an outer periphery of the intermediate ring and outer ends attached at respective locations to an inner periphery of the outer ring, the outer links extending transversely of the inner links, the rings and links being unitarily formed with one another; and a pair of flexible second inner links extending parallel to the first inner links and having inner ends attached at the inner-link inner-end locations to the outer periphery of the inner ring and outer ends attached at respective locations to the inner periphery of the intermediate ring; and a pair of flexible second outer links extending parallel to the first outer links and having inner ends attached at the outer-link inner-end locations to the outer periphery of the intermediate ring and outer ends attached at respective locations to the inner periphery of the outer ring.

2. The coupling defined in claim 1 wherein the rings and links are of the same axial thickness.

3. The coupling defined in claim 1 wherein the rings and links are of plastic.

4. The coupling defined in claim 1 wherein the second pairs of links extend angularly oppositely from the respective inner ends to the respective first pairs of links.

5. The coupling defined in claim 1 wherein the intermediate ring is formed with a plurality of axially throughgoing holes leaving webs extending diagonally of the links.

6. The coupling defined in claim 1 wherein the rings are substantially thicker than the links.

7. The coupling defined in claim 1 wherein each first inner and outer link extends angularly oppositely to the respective second inner and outer link from its inner end.

\* \* \* \* \*